United States Patent [19]

Kageorge

[11] Patent Number: 4,613,102

[45] Date of Patent: Sep. 23, 1986

[54] PNEUMATIC DEICERS WITH TEMPLATE

[75] Inventor: Pedro W. Kageorge, Cuyahoga Falls, Ohio

[73] Assignee: The B. F. Goodrich Company, Akron, Ohio

[21] Appl. No.: 703,958

[22] Filed: Feb. 21, 1985

[51] Int. Cl.[4] .............................................. B64D 15/18
[52] U.S. Cl. ............................ 244/134 A; 244/134 R; 244/DIG. 13
[58] Field of Search .......... 244/219 A, 134 R, 134 A, 244/DIG. 13

[56] References Cited

U.S. PATENT DOCUMENTS

| | | | |
|---|---|---|---|
| 2,251,430 | 8/1941 | Taylor | 244/134 A |
| 2,271,466 | 1/1942 | Schmidt et al. | 244/134 A |
| 4,463,919 | 8/1984 | Bac | 244/134 A |
| 4,494,715 | 1/1985 | Weisend | 244/134 A |

*Primary Examiner*—Trygve M. Blix
*Assistant Examiner*—Mark R. Valliere

*Attorney, Agent, or Firm*—Harry F. Pepper, Jr.; Woodrow Ban

[57] ABSTRACT

A pneumatic deicer having a deformable sheet formed of a fluid-impervious, resilient material adapted to be secured with respect to the leading edge of an aircraft wing. A rigid template with spaced, parallel apertures is secured to the face of the deformable sheet remote from the aircraft wing. The regions of the deformable sheet corresponding to the apertures form fluid passages adapted to be coupled with a source of fluid such as air so that the deicer may be cyclically expanded and contracted to break up ice accumulations on the deicer. A cover ply is secured to the outer face of the deformable sheet to expand and contract therewith and to add wear resistance to the deicer. The periphery of the inner face of the deformable sheet may be secured to the leading edge of the aircraft wing through an inner or base ply or, in the alternative, it may be secured directly thereto without the inclusion of the inner or base ply.

11 Claims, 5 Drawing Figures

PNEUMATIC DEICERS WITH TEMPLATE

BACKGROUND OF THE INVENTION

This invention relates generally to pnuematic deicers of the type having a sheet of rubberized fabric secured with respect to the leading edges of an aircraft wing, the deicer also having a rigid template with apertures to define a series of inflatable sections in the deicer which may be alternately expanded and contracted by fluid pressure to break up ice accumulations which undesirably tend to form on the surface of the deicer when the aircraft is operating in severe climatic conditions.

During flight, aircraft are periodically exposed to conditions of precipitation and low temperatures which may cause the formation of ice on the leading edge of their wings, or other airfoils. During such conditions, it is imperative that this ice be removed if the aircraft is to perform safely. To this end, various types of structures have been designed and utilized to break up and remove such ice in order to insure the safe performance of aircraft. However, icing conditions normally constitute only a relatively small portion of the total flight time for most aircrafts. During ice-free periods, when the deicing equipment is not in operation, it is important to maintain the exterior surfaces of the deicers smooth because these surfaces must serve as the airfoils in providing for the safe flight of the aircraft. Any irregularity on these surfaces can seriously hinder the safe performance of the aircraft by creating dangerous air turbulance. Further, excessive bulk and weight of the deicer would increase the cost of materials unnecessarily, the manufacturing cost and also the weight of the aircraft resulting in unnecessary fuel consumption.

Prior to the present invention, various efforts have been made in the design and manufacture of pneumatic deicing equipment with varying degrees of commercial success and reliability. One of the earlier attempts to solve the problem of deicing is described in U.S. Pat. No. 2,168,328 to Diehl. The Diehl disclosure is particularly concerned with more positively holding the deicer sheeting against the leading edge of the aircraft to avoid its flapping. The disclosure is directed to equalizing the pressure on the under surface of the deicer with the pressure on its outer surface. To that end, the Diehl deicer utilized a resilient, elastomeric member molded in a complex design requiring sophisticated fabrication techniques at obviously excessive costs in terms of materials, molds and the like, and require highly skilled technicians.

Eventually, pneumatic deicers turned to the use of a plurality of layers of sheet material to effect the desired ice removing function. Examples of these designs are found in U.S. Pat. No. 2,440,533 to Antonson and U.S. Pat. No. 2,957,662 to Hess. According to those disclosures, air chambers were formed in the airfoil by a large number of layers of elastomeric sheets, sewn or otherwise joined, in intricate patterns which, of necessity, undesirably increased the amount of materials, weight, manufacturing time and cost. Although such designs overcame the need for molded parts, they did include the use of materials with complex cross-sectional configurations, probably extruded, which still precluded the utilization of more standardized sheeting material with rectangular cross-sections.

A yet further improvement over the above-mentioned prior art approaches to a more economical and reliable solution to the deicing problem is described in U.S. Pat. No. 3,604,666 to Achberger. According to that disclosure, separate tubes of resilient, elastomeric material were spaced in a parallel array between interior and exterior sheeting members. Although reliable performance resulted, and molding and extrusion were eliminated, the separate tubes had to be individually attached to the adjacent layers in a precise orientation. This required a high degree of craftsmanship for accurate fabrication along with the high cost and unnecessary weight which resulted from the use of the excess materials of the separate tubes.

Perhaps the most desirable pneumatic deicers in the prior art are described in U.S. Pat. No. 3,370,814 to Kageorge, et al. and in U.S. Pat. No. 3,690,601 to Roemke. According to those disclosures, simple commercial elastomeric sheeting material with rectangular cross-sectional configurations was employed without the utilization of excess material to constitute the passages which functioned as the prior art available as of that time. The deicer passages were formed by stitching together superposed layers of resilient, elastomeric sheeting. The stitches corresponded to the edges of the passages for constraining the movement of fluid which effected the predetermined expansion and contraction of the deicer to break and remove the ice on the airfoil and thereby maintain the aircraft in a safe mode of operation.

The present invention is directed to pnuematic deicers which overcome the problems of the prior art. They are constructed with discrete passages for air or other fluid whereby the passages may be rapidly and reliably inflated and deflated to expand and contract the deicers for the removal of ice formations from the leading edge of aircraft wings. These deicers are constructed from a minimum amount of resilient, elastomeric sheeting material and with rectangular cross-sectional configurations for reduced cost and weight. They can be assembled without the employment of highly skilled technicians. Further, increased efficiencies are realized by aircraft on which they are employed because of their reduced weight as well as their smooth conformance to the preferred airfoil shape when such deicers are not in operation.

The foregoing has outlined some of the pertinent objects and advantages of the present invention. These objects and advantages should be construed to be merely illustrative of some of the more prominent features and applications of the intended invention. Many other beneficial results can be obtained by applying the disclosed invention in a different manner or modifying the invention within the scope of the disclosure. Accordingly, other objects and advantages as well as a fuller understanding of the invention may be had by referring to the summary of the invention and the detailed description describing the preferred embodiments in addition to the scope of the invention defined by the claims taken in conjunction with the accompanying drawings.

SUMMARY OF THE INVENTION

The present invention is defined by the appended claims with the specific embodiments shown in the attached drawings. For the purpose of summarizing the invention, the invention may be incorporated into a device such as a pnuematic deicer adapted to be secured around its periphery with respect to the leading edge of an aircraft wing or other surface portions of an aircraft structure where it is desirable to prevent ice accumulation.

The deicer is comprised of a deformable sheet formed of a fluid-impervious, resilient material and a rigid template formed of a high tensile strength, low elongation material secured to the sheet on one face thereof. The template is provided with apertures corresponding to those regions of the sheet, the fluid passages, adapted to be deformed and with the remaining regions of the template corresponding to the regions of the deformable sheet adapted not to be deformed.

Means are provided to couple a source of fluid such as air to adjacent the inner face of the deformable sheet whereby when fluid is cyclically introduced to, and evacuated from, adjacent the inner face of the deformable sheet the deicer will expand and contract to break up and remove ice accumulations from the deicer.

The deformable sheet may be fabricated from a woven fabric and coated with a resilient elastomer on the side thereof remote from the wing. This allows for the expansion and contraction of the deformable sheet concurrently with the introduction and evacuation of fluid remote from the coating.

A cover ply may be secured to the coated side of the deformable sheet. The cover sheet is formed of a resilient material to expand and contract with the deformable sheet and to increase the wear and weather resistance of the deicer and to add an aesthetic appearance. Neoprene has been found to be a preferred material for these purposes. The cover ply and the deformable sheet may be one and the same where the rigid template is secured to the face of the cover ply adjacent the aircraft wing.

For some applications it has been found desirable to also utilize a base ply between the leading edge of the aircraft wing and the deformable sheet. Such a base ply would be secured to the aircraft wing, but only the periphery of its outer side would be secured to the deformable sheet in order to allow the expansion and contraction of the center portion of the deicer. The base ply is preferably formed of any fluid impervious elastomer, plastic or rubber, to ensure that the fluid for inflating and deflating the deicer will not leak out from the passages through the wing.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should be also realized by those skilled in the art that such equivalent constructions do not depart from the spirit and scope of the invention as set forth in the appended claims.

BRIEF DESCRIPTION OF THE DRAWINGS

For a fuller understanding of the nature and objects and advantages of the invention, reference should be made to the following detailed description taken in connection with the accompanying drawings in which.

Similar reference numerals refer to similar parts throughout the several views of the drawings.

DETAILED DESCRIPTION

Figure 1:
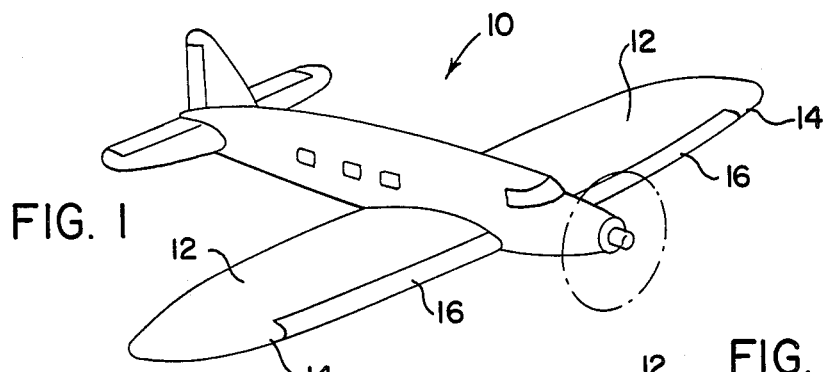
FIG. 1 is a perspective view of a pnuematic deicer constructed in accordance with the principles of the present invention and secured to the leading edge of an aircraft wing.

Shown in the drawings at FIG. 1 is an aircraft 10 having wings 12, the leading edges 14 of which constitute its airfoils. Each of the airfoils is provided with a pnuematic deicer 16 constructed in accordance with the principles of the present invention. One of these leading edges is shown in an enlarged perspective view in FIG. 2. This view shows the leading edge portion of the wing with its pnuematic deicer operatively secured thereto. The pnuematic deicer is shown with portions of its layers removed to illustrate the salient internal constructions.

Figure 2:
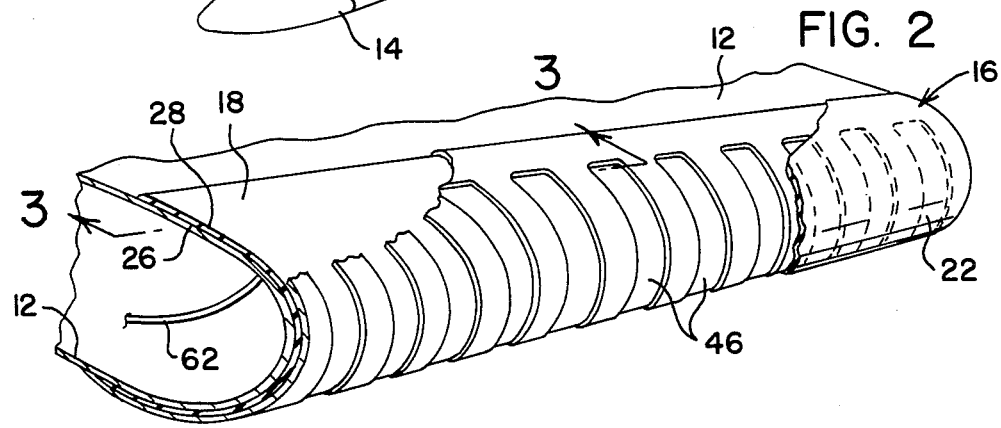
FIG. 2 is an enlarged perspective view of the pnuematic deicer as shown in FIG. 1 with parts broken away to show internal constructions thereof.
Figure 3:
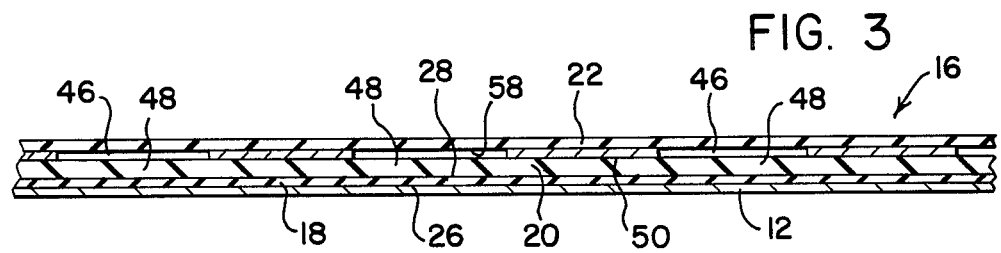
FIG. 3 is a sectional view of the pnuematic deicer shown in FIGS. 1 and 2 and taken along line 3—3 of FIG. 2.
Figure 4:
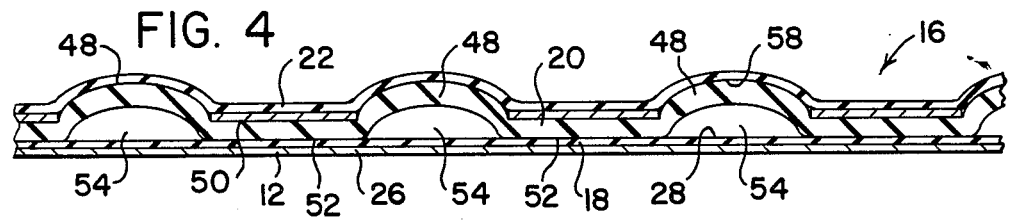
FIG. 4 is a sectional view taken along line 3—3 of FIG. 2 similar to FIG. 3 but showing the pnuematic deicer in an inflated condition.

The pnuematic deicer of FIG. 2 is formed of three ply layers, each of an essentially constant, rectangular cross-sectional configuration. These layers include the inner or base ply 18, the deformable sheet 20, and an exterior or cover ply 22. The inner or base ply is positioned inwardly of the other two layers 20 and 22 and the outer or cover ply 22 is positioned outwardly of the other two layers 18 and 20. As used herein the terms inner and inwardly are intended to mean in the direction toward the wing 12 and away from the outer or cover ply 22. The terms outer and outwardly are intended to mean in the direction away from the wing 12 or toward the outer or cover ply 22. These three layers are generally consistent in their cross-sectional configuration and in their shape as they are secured together in a superposed relationship for securement to the leading edge of the aircraft.

The inner or base ply 18 is located next adjacent to the leading edge 14 of the aircraft 10 which is to be provided with the deicer 16. It is formed of a sheet of fluid-impervious material such as an elastomer, plastic or rubber, natural or synthetic, or blends thereof. The entire inner face 26 of the base ply 18 is adapted to be secured to the leading edge of the aircraft whereby air or other fluid entrapped outwardly of the outer face 28 of the base ply 18 by the deformable sheet 20 will not permeate or leak inwardly through any seam or other aperture in the aircraft leading edge but will, rather, be retained between the base ply 18 and deformable sheet 20 for the inflation and deflation of the deicer 16.

Next most adjacent to the wing and positioned immediately outwardly of the base ply is the deformable sheet 20. The deformable sheet may be formed as a simple resilient, elastomeric membrane or, in the alternative, it may be formed of a stretchable or extensible fabric, preferably any known woven material formed of natural or synthetic threads so long as the fabric is capable of being stretched or extended during the inflation and deflation of the deicer. A resilient, elastomeric material is calendered or otherwise coated to the outer face of the fabric to constitute a coating having inner and outer faces. This coating serves two functions. The first function is to improve the ability of the deformable sheet to retain fluid such as air between it and the base ply during inflation and deflation of the deicer. The second function of the coating is to assist the deformable sheet to return to its position flush with the inner ply and leading edge of the aircraft when the deicer is deflated. This resilient characteristic enhances the operability of the deicer as an airfoil when the deicer is not being utilized and during the intermittent deflation step whenever the deicer is being utilized.

The inner face of the deformable sheet is left in its natural fabric state to preclude the intimate contact at 52 between the outer face 28 of the base ply 18 and the inner face of the deformable sheet 20 when the deicer is being deflated. Such intimate contact would preclude the desired flow of fluid from the deicer by the entrapment of such evacuating fluid.

Positioned next outwardly of the deformable layer is a rigid template formed of stainless steel, plastic reinforced with glass or carbon fibers, or any other lightweight, high tensile strength, low elongation material. The template is formed in a curved configuration to conform to the leading edge of the aircraft wing with which it is to be employed. It is shown formed with elongated parallel apertures 46 corresponding to the regions 48 of the deformable sheet to be expanded and contacted during operation of the deicer, although a variety of aperture shapes may be used. The entire inner face 50 of the template is secured by cementing or bonding to the deformable sheet, or positioned relative to the sheet in some other fashion, to restrict the deformation of the deformable sheet in those regions where no apertures occur.

During the operation of the deicer, the inner face of the template secured to the deformable sheet will allow the desired expansion of the deformable sheet in the passages 54 parallel to each other and corresponding to the apertures 46 in the template. The use of separate and spaced regions of inflation between the non-inflatable regions in an undulating pattern of expansion and contraction has been found to be particularly effective in performing the deicing function.

When the inflating fluid is provided to the space between the deformable sheet and the base ply, it will effectively form passages in a parallel array similar to those previously attainable only with separate discrete tubes or sewn zones as described in other prior art structures but without the added manufacturing steps of sewing plural sheets or separate tubes together.

The drawings illustrate the passages for the inflating fluid as extending cordwise on the aircraft wing. It should be understood that the passageways could be perpendicular thereto extending from the fuselage of the aircraft toward the wing tip rather than the direction of aircraft motion or any other orientation found to be sufficient to remove ice. The selection of the orientation of the passages is largely dependent upon the nature of the aircraft with which the pnuematic deicer is to be utilized.

Securement of the various deicer layers together and to the leading edge of the aircraft may be accomplished by any of the known cements or other bonding agents compatible with the materials employed or may be achieved by mechanical means, if desired.

The outer or cover ply 22 is of the same size and shape as the deformable sheet 20 and base ply 18. It could also be slightly larger in order to insure the total covering of the two layers inwardly thereof. The cover layer is cemented over the entire inner face 58 to the outer face 48 of the deformable sheet 20 for concurrent expansion and contraction therewith. It is preferably formed of a resilient, extensible material to expand and contract with the deformable sheet. It is also of a material selected to extend the weather resistant properties of the deicer. It is also selected to provide a more aesthetically pleasing appearance. An exemplary material for such varied purposes is Neoprene.

A communication means 62 is provided to couple the inflatable passages 54 of the deicer 16 with a source of fluid such as air or other fluid to introduce or evacuate the fluid from the passages during inflation and deflation of the deicer in a continuous cycle of operation, in a manner as is well known in the art.

It is this cycling, including the expansion and contraction of the passages and the inflation and deflation of the deicer, which will break up any ice formation on the airfoil of the aircraft with the normal motion of the aircraft forcing the ice therefrom.

Figure 5:
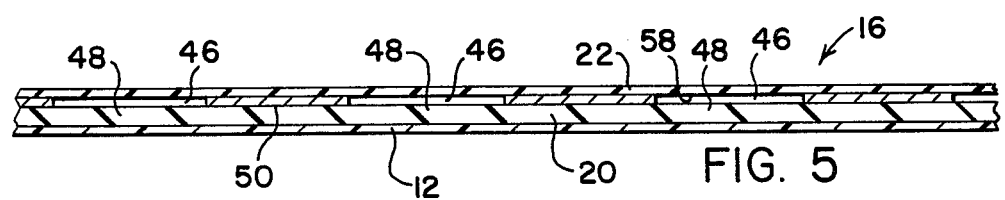
FIG. 5 is a sectional view of an alternate embodiment of a pnuematic deicer of the present invention and secured to the leading edge of an aircraft wing, similar to the showing of FIG. 3, but with the inner or base ply eliminated.

An alternate embodiment of the present invention is shown in FIG. 5. In that embodiment, the base ply 18 is eliminated. Such ply is normally necessary for proper operation when the leading edge of the aircraft is formed of metal which may have apertures, imperfect seams, spaces adjacent rivets or the like as frequently occurs during construction and which may act as a conduit for allowing the escape of fluid from the passages of the deicer and thus hinder its effective operation. Many of the newer aircraft, however, have wings formed of molded reinforced plastics or other composite materials or may be provided with their own sealer coating which are totally impervious to the flow of fluid therethrough. For such applications, the periphery of the deformable sheet may be bonded directly to the leading edge of the aircraft and the flow of fluid to the passages 54 between the deformable sheet 20 and the leading edge 14 of the aircraft wing 12 is as effective and as fluid impervious as is the primary embodiment wherein the inner or base ply 18 was utilized.

It should be understood that the term wing as used in this application is meant to encompass a rotary wing such as the blade of a helicopter, a non-fixed wing aircraft, just as it is meant to encompass the fixed wing of an aircraft of the type shown in FIG. 1. The leading edge of a helicopter blade is, in fact, an airfoil subject to much the same type of icing and other problems as fixed wing aircraft and employing deicers to overcome those same type of problems, all as discussed above.

The present disclosure includes that contained in the appended claims as well as that of the foregoing description. Although this invention has been described in its preferred forms and embodiments with a certain degree of particularity, it is understood that the present disclosure of the preferred forms and embodiments has been made only by way of example and that numerous changes in the details of construction and the combination and arrangement of parts may be resorted to without departing from the spirit and scope of the invention.

Now that the invention has been described what is claimed is:

1. A pneumatic deicer adapted to be secured to an airfoil surface and which has a plurality of expansible and contractible portions for breaking up and removing accumulated ice, said deicer including:
- a deformable sheet of fluid impervious resilient material;
- a rigid template secured to the outer face of said deformable sheet, said template having apertures corresponding to the plurality of expansible and contractible portions of said deicer which apertures allow deformations therethrough of said sheet; the remaining regions of said template restraining deformation of said sheet; and
- means to couple said deicer to a source of fluid such that when fluid is introduced to, and evacuated from said deicer, said deicer will expand and contract said plurality of expansible and contractible portions.

2. The pneumatic deicer as set forth in claim 1 wherein said template is curved to conform to the shape of the airfoil surface and said apertures extend parallel to each other.

3. The pneumatic deicer as set forth in claim 1 and further including a cover ply having its inner face secured to the outer faces of said sheet and said template, said cover ply being fabricated of a wear-resistant, deformable material capable of expanding and contracting with said sheet during the operation of the deicer.

4. The pneumatic deicer as set forth in claim 1 and further including a base ply having its inner face adapted to be secured to the airfoil surface and with the periphery of the inner face of said deformable sheet secured to the periphery of the outer face of said base ply, said base ply being fabricated of a fluid-impervious material to preclude the leaking of fluid.

5. The pneumatic deicer as set forth in claim 1 wherein the periphery of the inner face of said sheet is adapted to be secured directly to the airfoil surface.

6. The pneumatic deicer as set forth in claim 1 wherein said apertures of said template are parallel to each other and extend spanwise with respect to the wing of an aircraft on which it is to be secured.

7. The pneumatic deicer as set forth in claim 1 and further including means to couple a source of fluid to passages formed by the inner face of said sheet whereby when fluid is cyclically introduced to, and evacuated from, the passages, the deicer will expand and contract to break up and remove ice accumulations from the deicer.

8. A pneumatic deicer adapted to be secured with respect to the leading edge of an aircraft wing, said deicer including
- a deformable sheet formed of fluid-impervious, resilient material adapted to be secured with respect to the leading edge of the aircraft wing;
- a rigid template curved to conform to the shape of the leading edge of the aircraft wing, said rigid template being secured to the outer face of said sheet remote from the aircraft wing, said rigid template being formed with parallel, elongated apertures corresponding to the regions of said sheet adapted to be deformed and with the remaining regions of the template corresponding to the regions of said sheet adapted not to be deformed;
- a base ply having it sinner face adapted to be secured to the leading edge of an airacraft wing and with the periphery of the outer face of said base ply secured to the periphery of the inner face of said sheet, said base ply being fabricated of a fluid-impervious material to preclude the leaking of fluid to interior of the aircraft wing; and
- a cover ply having its inner face secured to the outer face of said sheet, said cover ply being fabricated of a wear-resistant, deformable material capable of expanding and contracting with said sheet during the operation of the deicer.

9. The pneumatic deicer as set forth in claim 8 wherein said apertures of said template extend spanwise with respect to the wing of the aircraft on which the deicer is to be secured.

10. A pneumatic deicer adapted to be secured to the leading edge of an aircraft wing, said deicer including
- a deformable sheet formed of fluid-impervious, resilient material adapted td be secured with respect to the leading edge of the aircraft wing, the periphery of said sheet being adapted to be secured directly to the leading edge of the aircraft wing;
- a rigid template curved to conform to the shape of the leading edge of the aircraft wing, said rigid template being secured to the outer face of said sheet remote from the aircraft wing, said rigid template being formed with parallel, elongated apertures corresponding to the regions of the template corresponding to the regions of said sheet adapted not to be deformed; and
- a cover ply having its inner face secured to the outer face of said sheet, said cover ply being fabricated of a wear-resistant, deformable material capable of expanding and contracting with said sheet during the operation of the deicer.

11. The pneumatic deicer as set forth in claim 10 wherein the apertures of said template extend spanwise with respect to the wing of the aircraft on which it is to be secured.

* * * * *